United States Patent [19]
Kimmel et al.

[11] Patent Number: 5,806,086
[45] Date of Patent: Sep. 8, 1998

[54] MULTIPROCESSOR MEMORY CONTROLLING SYSTEM ASSOCIATING A WRITE HISTORY BIT (WHB) WITH ONE OR MORE MEMORY LOCATIONS IN CONTROLLING AND REDUCING INVALIDATION CYCLES OVER THE SYSTEM BUS

[75] Inventors: Jeffrey S. Kimmel, Chapel Hill, N.C.; Roy Clark, Hopkinton, Mass.

[73] Assignee: Data General Corporation, Westboro, Mass.

[21] Appl. No.: 661,578

[22] Filed: Jun. 11, 1996

[51] Int. Cl.[6] .................................................... G06F 12/08
[52] U.S. Cl. ........................ 711/145; 711/120; 711/146; 711/148
[58] Field of Search .................................... 711/120, 121, 711/143, 144, 145, 146, 148, 156, 166

[56] References Cited

U.S. PATENT DOCUMENTS 5,522,058  5/1996  Iwase et al. ............................. 711/145

*Primary Examiner*—Eddie P. Chan
*Assistant Examiner*—Hiep T. Nguyen
*Attorney, Agent, or Firm*—Donald A. Levine; Robert L. Dulaney

[57] ABSTRACT

A memory controller system for use with a plurality of processor nodes capable of reducing the number of invalidate cycles on a shared system bus in cache coherent non-uniform memory architecture multiprocessor by detecting when a memory block is being updated by multiple nodes and requesting exclusive access for any read of the actively updated data.

6 Claims, 2 Drawing Sheets

MULTIPROCESSOR MEMORY CONTROLLING SYSTEM ASSOCIATING A WRITE HISTORY BIT (WHB) WITH ONE OR MORE MEMORY LOCATIONS IN CONTROLLING AND REDUCING INVALIDATION CYCLES OVER THE SYSTEM BUS

CROSS REFERENCE TO RELATED APPLICATIONS

There are no related applications.

BACKGROUND—FIELD OF INVENTION

This invention is related to the field of data processing. More particularly, it is directed to memories having coherent data and caches with cache status data bits.

BACKGROUND—DESCRIPTION OF PRIOR ART

This invention relates to computer system that connect multiple processors together using a high-speed bus such that all of the processors share a single coherent address space. More directly this invention relates to the ability to scale such computer systems to many processors.

There has been a great deal of work in this area including work generated by an IEEE Standards Committee which produced IEEE Std 1596-1992 IEEE Standard for Scalable Coherent Interface (SCI). That standard provides good background for the present invention and is incorporated by reference herein.

U.S. Pat. No. 5,197,146 issued Mar. 23, 1993 to Ross V. LaFetra describes a method for maintaining cache coherence in a multiprocessor computer system. LaFetra's method still requires a large number of transactions on the system bus. The present invention would require at least one fewer transaction.

There were two papers presented at the 20th Annual International Symposium on Computer Architecture in San Diego, Calif. and published in the May 1993 issue of Computer Architecture News which relate to the present invention.

The first paper, "Adaptive Cache Coherency for Detecting Migratory Shared Data" by Alan L. Cox and Robert J. Fowler describe modifications to common MESI protocol to reduce the number of invalidate messages. Cox and Fowler describe adding additional states, such as, Migratory-Clean and Migratory-Dirty to the protocol. The present invention works with standard microprocessors using common MESI protocol. Commercial microprocessors, such as the Intel Pentium® Pro are produced in huge volumes and it is very desirable to use common MESI protocol exactly as implemented in those chips.

The second paper, "An Adaptive Cache Coherence Protocol Optimized for Migratory Sharing" by Per Stenström, Mats Brorsson, and Lars Sandberg describes a different set of modifications to common MESI protocol. As with the first paper, this paper has the drawback of not using the common MESI protocol as implemented by the major microprocessor vendors. The protocol presented in this paper also has another major limitation, "There is an explicit notion of the home of the coherence state. The detection mechanism relies on the fact that all global read and write requests must interrogate the home directory." The present invention does not have this requirement.

OBJECTS AND ADVANTAGES

The broad objective of the present invention to provide an improved computer system.

Another objective of the present invention is to provide within such computer systems reduced bus traffic on the system bus by predicting when write sharing is occurring, thereby avoiding the extra invalidate cycles that would otherwise occur when two nodes pass data back and forth.

Yet another objective of the present invention is to use ordinary microprocessors produced in high volume and at low cost by vendors, for example, Intel and Motorola, without making any modifications to the cache coherency protocols built into those chips.

SUMMARY

The present invention predicts when write sharing is occurring in a multi-processor computer system. Write sharing means that a modified data block is being passed back and forth between two or more processors.

Many modern microprocessors, such as the Pentium® Pro from Intel and the PowerPC® from Motorola, issue memory requests which indicate if the microprocessor intends to write the data it is requesting. In the PowerPC 601 the requests are READ, READ WITH INTENT TO MODIFY, WRITE WITH FLUSH, WRITE WITH KILL. In the Pentium Pro there are three types of caching memory requests: READ SHARED, READ EXCLUSIVE, and WRITE. READ SHARED is used when the microprocessor does not expect to write the data block and copies of the data are allowed to be cached by other microprocessors. READ EXCLUSIVE is used when the microprocessor does expect to write the data block and copies of the data must be purged from all other microprocessors' caches. WRITE is used to write the modified data block back to memory.

For convenience, the invention will be described using the Pentium Pro terminology. Other microprocessors perform equivalent functions using different terminology. The specific examples should not be considered as limits on the scope of this patent.

While the issuance of a READ SHARED or READ EXCLUSIVE request indicates the microprocessor's intent, this indication is based only on what the current instruction is doing and not on what the larger program may be doing.

The present invention involves the use of a write history bit (WHB) for each block of memory. When a memory location is written the write history bit associated with that location's block is set. If there is a READ SHARED issued by a microprocessor for data in a memory block with its WHB already in the set state, the read is treated as a READ EXCLUSIVE. In a system with a hierarchical cache architecture, correctly predicting when a memory block contains shared writable data will reduce traffic on the system bus and increase system performance.

PREFERRED EMBODIMENT

The current invention is related to the reduction of bus traffic in a multiprocessor system. In particular, it relates to the reduction in the number of invalidate messages on a shared system bus. The description of the preferred embodiment includes an explanation on use of the invention with Intel Pentium® Pro processors and the IEEE Scalable Coherent Interface (SCI) as the system bus, which illustrate how to practice the present invention in its current best mode. These specific examples of usage should not be considered as limits on the scope of this patent, because the invention disclosed and claimed herein could be made to work with, for example, an Motorola PowerPC® or similar devices or other cache/memory/bus hierarchies.

Figure 1:
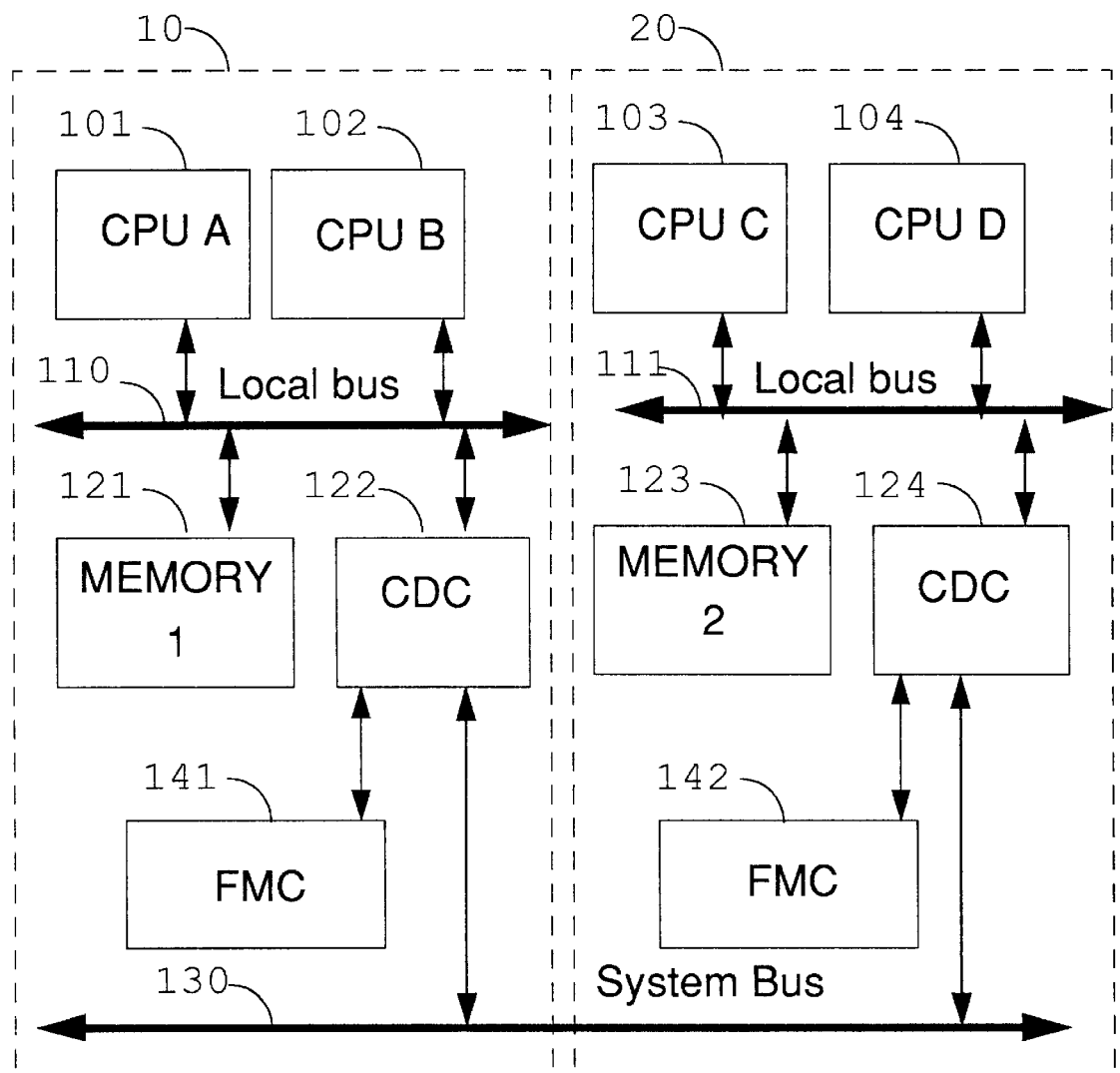
FIG. 1 is a block diagram of a typical multi-processor system.

The system configuration is shown in FIG. 1. The computer system is composed of multiple nodes 10, 20. The nodes are connected together by a system bus 130. Each node has a local bus 110, 111 and one or more microprocessors 101, 102, 103, 104 and a memory 121, 123 connected to the local bus 110, 111. There is also a Cache and Directory Controller (CDC) 122, 124 connected to the system bus 130 and a local bus 110, 111. The general operation of computer systems as shown in FIG. 1 is described in IEEE Std 1596–1992 and is understood by those of ordinary skill in the art.

The system configuration shown in FIG. 1 only has two nodes 10, 20 and each node only has two CPUs 101, 102, and 103, 104. A typical system configuration would have four CPUs on each node and could have several additional nodes. FIG. 1 is intended to show the invention in such full, clear, concise, and exact terms as to enable any person skilled in the art to make and use the invention in the best mode contemplated by the inventor. Adding more CPUs or more nodes to the description would only make it less concise and would not teach anything above what is shown in FIG. 1. It will be understood that there may be more than two CPUs on any local bus and there may be more than two nodes on the system bus 130. System bus 130 may also be implemented in a number of different ways from a classic backplane bus to a full cross-bar switch or any other connection scheme. The present invention does not depend on the implementation of system bus 130. There may be nodes which do not have local memory and there may be memory-only nodes which do not have local CPUs.

In FIG. 1, CPU 101, 102, 103, 104 could be Intel Pentium Pro® microprocessors. Memory 1 121, memory 2 123, FMC 141 and FMC 142 could all be standard dynamic random access memories. CDC 122 and CDC 124 could be gate arrays, such as, those built by LSI Logic. Local bus 110 and local bus 111 could be etch on a printed circuit board and system bus 130 could be IEEE Scalable Coherent Interconnect as described in the earlier-mentioned IEEE Std 1596-1992.

One key property of the computer system is that the combined memories 121 and 123 are treated as a single address space. For example, Memory 1 121 may hold addresses from 0 to 4000 and Memory 2 123 may hold addresses from 4001 to 10000. When CPU A 101 needs to access memory location 5000, for example, the CDC 122 on node 10 routes the request to the system bus 130 and the CDC 124 on node 20 receives the request from the system bus 130 and routes it to Memory 2 123.

Memory on the same node as a CPU is called "near memory" to that CPU and memory on a different node is called "far memory."

The nodes do not need to all have the same amount of memory or the same number of CPUs.

There are also multiple caches. For example, each CPU typically contains a first and a second level cache. These caches while important for system operation are well understood and are not required to understand the current invention. They are not shown or described.

Each node 10, 20 has a Far Memory Cache (FMC) 141, 142 connected to its CDC 122,124. The FMCs 141, 142 store several kinds of information: (1) blocks of data from far memory, (2) the status of some blocks in the local memory and (3) the status of some of the data blocks from far memory. When a block of data is actively being shared, the status for that block of data is stored in the FMC of every node that is participating in the sharing. The FMC's far memory block storage is typically from 16 megabytes to 128 megabytes in size. The FMCs 141, 142 reduce traffic on system bus 130 by holding information from far memory on the local node. For example, if CPU A 101 on node 10 reads a byte from memory 2 123 on node 20, that byte has to pass onto local bus 111 through CDC 124 onto system bus 130 through CDC 122 onto local bus 110 and into CPU A. When this read happens CDC 122 also stores a copy of the byte in FMC 141 so subsequent reads of that byte can be performed from FMC 141 and do not require transactions on system bus 130.

As viewed by the processors on node 10, any given block of data in the memory 1 121, and memory 2 123 will be in one of three states:

1. SHARED. This block may be read by one or more CPUs, however, it may not be written. Most instructions are in shared read only blocks.
2. EXCLUSIVE. This block may be read or written only by CPUs node 10. For example, if a block in memory 1 121 was marked EXCLUSIVE on node 10 it could be read or written by CPU A 101 or CPU B 102 but not CPU C 103 or CPU D 104.
3. NO ACCESS. This memory may be read or written by CPUs on other nodes but not by CPUs on node 10. This data is stored in some other node. For example, if a block in memory 1 121 is marked as NO ACCESS, that block can be read or written by CPU C 103 or CPU D 104, but not by CPU A 101 or CPU B 102. A copy of the block is stored in FMC 142.

It would be possible to store the status of each block of memory in the memory itself. Thus the status of each block in memory 1 121 could be stored along with the data in memory 1 121 and the status of each block in memory 2 123 could be stored along with the data in memory 2 123. This would require a full directory and not just two state bits. A preferred embodiment, however, stores the status in the far memory cache (FMC). Thus FMC 141 contains not only the status for blocks in memory 2 123 but also the status of blocks in memory 1 121. If FMC 141 needed to store the status of every block on every node it would be quite large, however, FMC 141 does not need to store the status unless a block is EXCLUSIVE or NO ACCESS or actively being shared by multiple nodes. Blocks are allowed to "fall out" of the cache. Since the number of blocks in active use is much smaller than all of memory, FMC 141 can be much smaller than all of memory.

The size of a block of memory is a design choice. If the blocks are large, less storage is required for the state information, however, a block will be marked as EXCLUSIVE even if only one byte is being actively written. It is generally desirable to make the blocks as small as possible to reduce the amount of data that must be passed around every time a shared variable is modified. The preferred embodiment uses 64 byte blocks.

When data is actively being written by multiple nodes the data and its associated block status must be passed back and forth between the nodes. For example, assume that the data block X has its "home" on node 2 20. In the example system shown in FIG. 1 the following "write sharing" conditions occur in the order presented:

1. Initially, the status of block X is NO ACCESS in FMC 141 and EXCLUSIVE in FMC 142. CPU A 101 issues a READ SHARED request for block X. Memory 2 123 sends block X through CDC 124 over system bus 130 through CDC 122 onto local bus 110 to CPU A 101. The block X is also stored in FMC 141. Both FMC 141 and FMC 142 change their state for block X to SHARED.
2. Next, CPU A 101 issues a READ EXCLUSIVE request for block X. CDC 122 sends a request over system bus 130 to CDC 124 and CDC 124 updates the state of block X in FMC 142 to NO ACCESS, CDC 122 updates the state of block X in FMC 141 to EXCLUSIVE.
3. Next, CPU C 103 issues a READ SHARED request for block X. FMC 141 sends the block X through CDC 122 over system bus 130 through CDC 124 onto local bus 111 to CPU C 103. The block X is also written in memory 2 123. Both FMC 141 and FMC 142 change their state for block X to SHARED.
4. Next, CPU C 103 issues a READ EXCLUSIVE request for block X. CDC 124 sends a request over system bus 130 to CDC 122 and CDC 122 updates the state of the block X in FMC 141 to NO ACCESS. CDC 124 updates the state of the block X in FMC 142 to EXCLUSIVE.
5. Next, CPU A 101 issues a READ SHARED request for block X. Memory 2 123 sends the block X through CDC 124 over system bus 130 through CDC 122 onto local bus 110 to CPU A 101. The block X is also stored in FMC 141. Both FMC 141 and FMC 142 change their state for block X to SHARED.
6. And finally, CPU A 101 issues a READ EXCLUSIVE request for block X. CDC 122 sends a request over system bus 130 to CDC 124 and CDC 124 updates the state in FMC 142 to NO ACCESS. CDC 122 updates the state of block X in FMC 141 to EXCLUSIVE.

Steps 3, 4, 5, and 6 can occur over and over as the data item is passed back and forth between node node 20 node 20.

If there were more than two nodes, it would be possible for the data to pass between two nodes and never be stored in a home memory location on a third node. The home location of the memory block does not have a material effect on the invention. Status information must be passed from one FMC to another and there can be at most one FMC with EXCLUSIVE access for any given block.

The present invention attempts to predict when a read will be followed shortly by a write and avoid ever placing data in the SHARED state. This is done by associating a Write History Bit (WHB) with each block in memory. When the WHB is used in a "write sharing" situation, the following conditions occur in the order presented:

1. Initially, the status of block X is NO ACCESS in FMC 141 and EXCLUSIVE in FMC 142. CPU A 101 issues a READ SHARED request for block X. Memory 2 123 sends the block X through CDC 124 over system bus 130 through CDC 122 onto local bus 110 to CPU A 101. The block X is also stored in FMC 141. Both FMC 141 and FMC 142 change their state for block X to SHARED.
2. Next, CPU A 101 then issues a READ EXCLUSIVE request for block X. CDC 122 sends a request over system bus 130 to CDC 124 and CDC 124 updates the state of block X in FMC 142 to NO ACCESS. CDC 122 updates the state of block X in FMC 141 to EXCLUSIVE and sets the WHB in node 10 associated with the block X.
3. Next, CPU C 103 issued a READ SHARED for block X. Node 10 FMC 141 sends the block X through CDC 122 over system bus 130 through CDC 124 onto local bus 111 to CPU V 103. The block X is also written into memory 2 123. Both FMC 141 and FMC 142 change their state for block X to SHARED.
4. Next, CPU C 103 then issues a READ EXCLUSIVE request for block X. CDC 124 sends a request over system bus 130 to CDC 122 and CDC 122 updates the state of block X in FMC 141 to NO ACCESS. CDC 124 updates the state of block X in FMC 142 to EXCLUSIVE and also sets the WHB in node 20 associated with the block X. The WHB associated with block X is now set on both node 10 and on node 20. Each node has its own set of WHBs.
5. Next, CPU A 101 issues a READ SHARED request for block X. CDC 122 detects that the WHB for block X is set and sends, instead of a READ SHARED request, a READ EXCLUSIVE request over system bus 130. Memory 2 123 sends the block X through CDC 124 over system bus 130 through CDC 122 onto local bus 110 to CPU A 101. The Write History Bit on node 10 is also cleared. Since a READ EXCLUSIVE request was used instead of a READ SHARED request, CDC 122 sets the state of block X in FMC 141 to EXCLUSIVE and CDC 124 sets the state of block X in FMC 142 to NO ACCESS. The block X is also stored in FMC 141.
6. Next CPU A 101 issues a READ EXCLUSIVE request for block X. Since the state of block X in FMC 141 is already EXCLUSIVE, there is no transaction on system bus 130. However, the READ EXCLUSIVE request sets the WHB on node 10.
7. Next CPU C 103 issues a READ SHARED request for block X. CDC 124 detects that the WHB for block X is set and sends instead a READ EXCLUSIVE request over system bus 130. FMC 141 sends the block X through CDC 122 over system bus 130 through CDC 124 onto local bus 111 to CPU B 103. The Write History Bit on node 20 is also cleared. Since a READ EXCLUSIVE request was used instead of a READ SHARED request, CDC 124 sets the state of block X in FMC 142 to EXCLUSIVE and CDC 122 sets the state in FMC 141 to NO ACCESS. The block X is also stored in memory 2 123.
8. And finally, CPU C 103 issues a READ EXCLUSIVE request for block X. Since the state of block X in FMC 142 is already EXCLUSIVE, there is no transaction on system bus 130. However, the READ EXCLUSIVE request sets the WHB on node 10.

Steps 5 to 8 can repeat over and over, but this four-step loop is now performed with two accesses over system bus 130 rather than four. The use of the WHB prevents FMC 141 or FMC 142 from ever putting the block in the SHARED state and there is no need for the SHARED→NO ACCESS and SHARED→EXCLUSIVE transitions.

There are many possible ways to implement the WHB. One way would be to store one extra bit with each 64 byte block in memories 121 and 123. That would add less than two tenths of one percent to the total amount of storage required to implement memories 121 and 123, however, for timing reasons the preferred embodiment uses the WHB cache 210 shown in FIG. 2.

Figure 2:
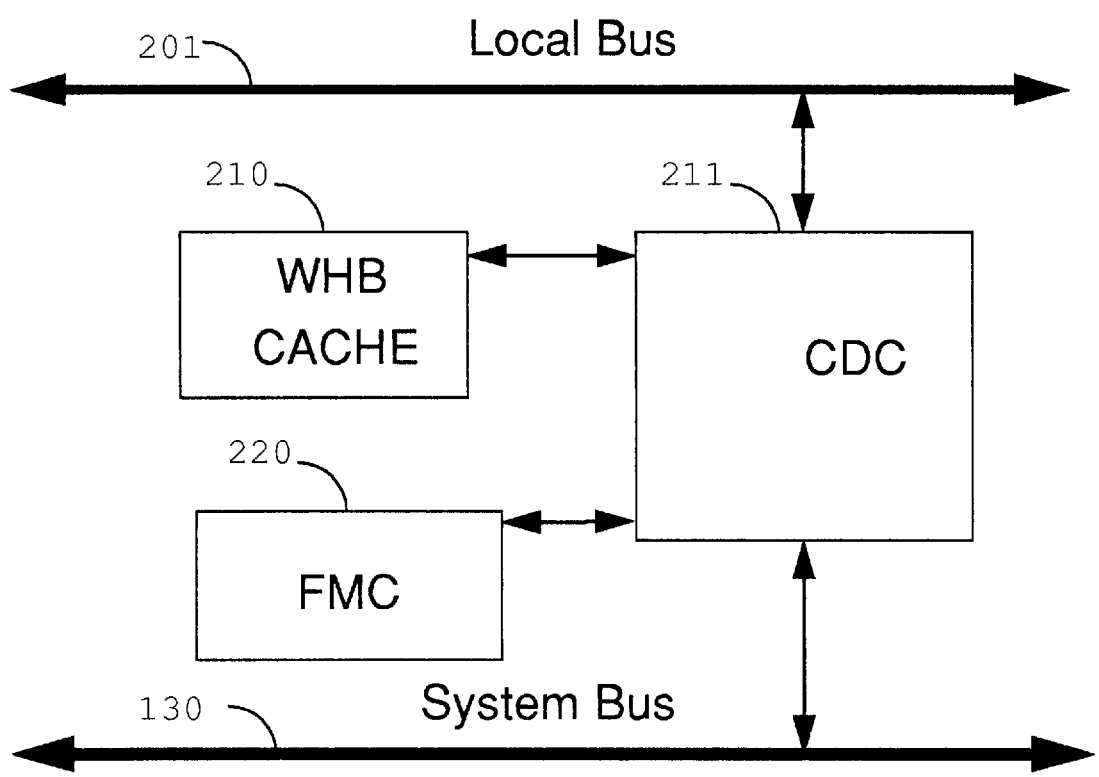
FIG. 2 shows the connection of the Write History Bit (WHB) cache to the cache and Directory Controller (CDC) in a single node.

FIG. 2 shows just one node. The WHB cache 210 contains one write history bit for each block status in FMC 220. The WHB cache 210 contains fewer bits than if one bit was assigned for each 64 byte block in memories 121 and 123 and it can be accessed faster. There is a possible problem that there can now be WHB cache misses where it is not possible to determine the correct state of the write history bit. In the case of a WHB cache miss the write history bit is assumed to be clear.

To prevent the WHB from over predicting write sharing, the WHB on a given node is cleared if there is a SHARED READ request and the FMC status for the data is NO ACCESS, as in step 5 above. The node will now have EXCLUSIVE access for the data block. If there are no new READ EXCLUSIVE requests by CPUs on that node to the data block, the assumption is made that active write sharing is complete.

There is an additional case where the Write History Bit is set. If there is a read request from another node for a block of data and one of the CPUs on the local bus indicates that the block of data is modified in that CPU's cache, the Write History Bit will be set.

Consider the following example using the system shown in FIG. 1. CPU A 101 has exclusive access to block X. CPU A 101 also has a modified copy of block X in its cache. Because of other activity by other processors, the Write History Bit falls out of the Write History Bit cache 210 connected to CDC 122. At some later point, CPU C 103 issues a read request for block X. When CDC 122 attempts to fetch block X over local bus 110, all of the CPUs connected to local bus 110 will check their caches to see if they have the most recent version of block X. This bus protocol is well known and called bus snooping. CPU A 101 will indicate that CPU A 101 has block X and block X has been modified. This indication is refered to as a MODIFIED SNOOP HIT. At that point, the WHB for block X will be set in the Write History Bit cache 210 connected to CDC 122 because the snoop hit indicates that block X was recently written.

Although the description above contains many specificities, these should not be construed as limiting the scope of the invention but as merely providing illustrations of some of the presently preferred embodiments of this invention. Various other embodiments and ramifications are possible within its scope.

Thus the scope of the invention should be determined by the appended claims and their legal equivalents, rather than by the examples given.

What is claimed is:

1. A memory control system for use with a plurality of microprocessors, said system comprising:
   (a) a system bus for transmitting addresses, instructions and data;
   (b) a plurality of nodes each one of said nodes being connected to said system bus and comprising:
      (i) one or more microprocessors each one of said microprocessors capable of issuing READ SHARED, READ EXCLUSIVE and WRITE requests;
      (ii) a memory having multiple addressable locations for storing said instructions and said data;
      (iii) a plurality of write history bits (WHBs) each one of said WHB being associated with one or more locations in said memory;
      (iv) a local bus connected to said microprocessors and said memory; and
      (v) a cache and directory controller (CDC), connected to said local bus, said system bus and said WHBs, wherein said CDC transmits a READ EXCLUSIVE request on said system bus when said CDC receives a READ SHARED request which cannot be satisfied within the node and the WHB associated therewith is in the set state.

2. The memory system according to claim 1 wherein when said CDC receives a READ EXCLUSIVE request on the local bus said CDC sets the WHB corresponding to said READ EXCLUSIVE request to the set state.

3. The memory system according to claim 1 wherein, upon receiving a READ SHARED request from said local bus, said CDC sets the WHB associated with said received READ SHARED request to the clear state if the memory location associated with said received READ SHARED request is in a NO ACCESS condition.

4. The memory system according to claim 1 wherein, upon receiving a read request from said system bus, said CDC sets the WHB associated with said received read request to the set state if there is a snoop hit on said local bus.

5. In a computer system having a plurality of nodes where each one of said nodes has:
   I. one or more microprocessors each one of said microprocessor capable of issuing READ SHARED, READ EXCLUSIVE and WRITE requests;
   II. a memory for storing instructions and data;
   III. a memory state having one of the values, NO ACCESS, SHARED or EXCLUSIVE associated with each location in said memory;
   IV. a plurality of write history bits (WHBs) associated with said memory each WHB being associated with one or more memory locations;
   V. a cache and directory controller (CDC) having a local port and a system port;
   VI. a local bus connected to said microprocessors, said memory and said local port on said CDC; and
   VII. the system port of each one of said CDCs connected to a system bus;

a method to reduce traffic on said system bus comprising:
   (a) placing the WHB associated with said memory location in the set state when any one of said microprocessors on the same node issues a READ EXCLUSIVE request to a memory location associated with said WHB;
   (b) placing the WHB associated with a memory location in the clear state when any one of said microprocessors on the same node performs a READ SHARED from the memory location and said memory state is NO ACCESS;
   (c) transmitting a READ EXCLUSIVE request to said system bus when said CDC receives a READ SHARED request on its local port and said READ SHARED request is for memory on a different node and the WHB associated with the memory location is in the set state; and
   (d) transmitting a READ SHARED request to said system bus when said CDC receives a READ SHARED request on its local port and said READ SHARED request is for memory on a different node and the WHB associated with the memory location is in the clear state.

6. The method according to claim 5 additionally comprising:
   (e) placing the WHB associated with said memory location in the set state when said CDC issues a read request on said local bus and there is a MODIFIED SNOOP HIT.

* * * * *